May 21, 1929.   G. E. FARLEY   1,713,824
PROTECTIVE CUSHION FOR GAUGES
Filed July 1, 1926

Inventor:—
George E. Farley
By Martin P. Smith, Atty.

Patented May 21, 1929.

1,713,824

UNITED STATES PATENT OFFICE.

GEORGE E. FARLEY, OF SOUTHGATE, CALIFORNIA.

PROTECTIVE CUSHION FOR GAUGES.

Application filed July 1, 1926. Serial No. 119,874.

My invention relates to a protective covering and cushion for the air pressure gauges that are utilized in connection with tire inflating valves, and the principal objects of my invention are to provide a relatively simple and practical protective covering that may be readily applied to a pressure gauge for the purpose of rendering the joints in the housing thereof air, dust and moisture proof, and to construct the protective covering from rubber, or analogous material, thereby providing a cushioning member that performs the function of a shock absorber to protect the gauge against injury as a result of shocks and vibration that may be received by the gauge while the tire inflating device is in service.

My improved protective covering is especially designed for use in connection with the pressure gauge that forms a part of the tire inflating valve disclosed in my co-pending application for U. S. Letters Patent filed June 23, 1925, Serial No. 39,014.

It will be understood that tire inflating valves are usually located at or near the end of a flexible tube and that the inflating device is subjected to comparatively rough usage while in service. Further, the inflating device and its gauge while in use very frequently are dropped on the ground or brought into contact with some part of the vehicle and such action tends to render the gauge inoperative or impair its efficiency due to disarrangement of its delicate parts. The gauge housing is usually provided with two or more joints and if the same are not thoroughly packed, it is possible for air, moisture and dust to enter said joints and affect the operating parts of the gauge within said housing.

I propose to overcome the objectionable results above mentioned by providing a one-piece protective covering for the gauge body, which covering will thoroughly close all joints in the gauge housing and which covering will also serve as a cushion or shock absorber to prevent injury to the gauge and its operating parts as a result of undue shocks that the gauge may receive while being used.

With the foregoing and other objects in view, my invention consists in certain novel features of construction and arrangement of parts that will hereinafter be more fully described and claimed and illustrated in the accompanying drawing, in which—

Figure 1:
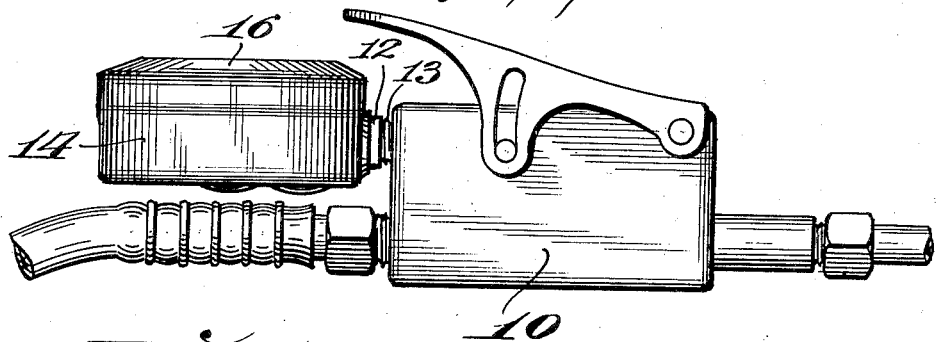
Fig. 1 is an elevational view of a tire inflating valve and its pressure gauge and with a protective covering member of my improved construction applied to the gauge.
Figure 2:
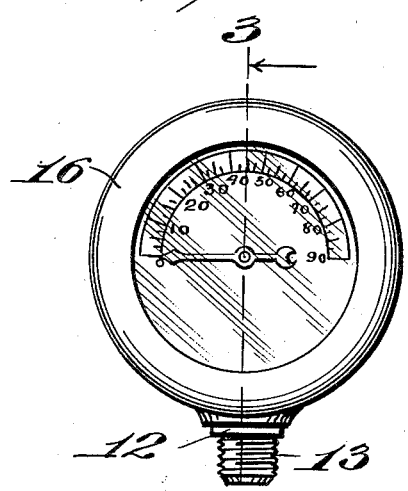
Fig. 2 is a plan view of a pressure gauge with my improved protective covering in position thereupon.
Figure 3:
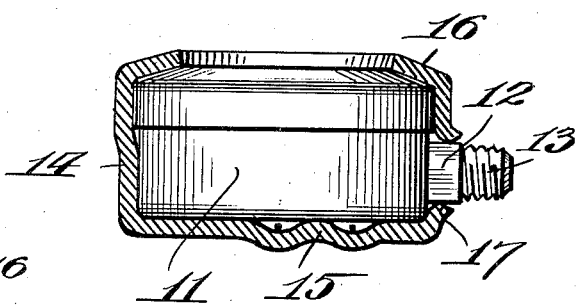
Fig. 3 is a cross section taken on the line 3—3 of Fig. 2.
Figure 4:
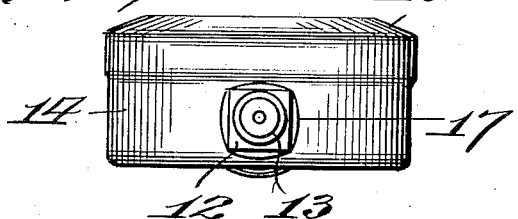
Fig. 4 is an elevational view of the protective covering in position on an air gauge.

Referring by numerals to the accompanying drawing, 10 designates the body of a tire inflating device having associated therewith an ordinary air pressure gauge that includes a housing 11, usually of sheet metal and projecting from the side of said housing is a shank 12 having a threaded portion 13 that is screw seated in the body 10 of the inflating device.

The housing 11 of the gauge is generally formed in two parts with the flange of one part fitting snugly over the flange of the other part and the upper one of the two parts being provided in its top with an opening that is closed by a section of glass, celluloid, or other transparent material through which the dial within the gauge body may be readily viewed.

The protective covering contemplated by my invention is preferably formed of rubber, rubber composition, or the like, and said housing, which is preferably moulded in a single piece, comprises a circular wall 14, an imperforate disk-shaped body 15, and a flange 16 that projects inwardly from the upper edge of the circular wall 14.

Formed in the circular wall 14 is an opening 17 for the accommodation of the shank 12 and in order to make the joint between the shank and the covering air, moisture, and dust proof, said joint may be coated and filled with shellac, or like material.

The circular wall 14 thoroughly closes and seals the joint between the upper and lower members of the housing 11 and the inwardly projecting flange 16 overlies the edge of the opening in the top of the housing, thus affording protection for the transparent member that is located in the top of the housing over the dial.

The walls of the protective covering should have sufficient thickness to produce a cushioning effect in the event that the gauge strikes against an object and thus said protective member performs the function of a shock absorber and tends to minimize disarrangement of the delicate parts within the gauge and also preventing breakage of the glass or transparent member in the top of the gauge housing.

Inasmuch as the protective covering overlies and seals all joints in the housing of the gauge, the operating parts within said gauge are protected against the injurious effects of dust, moisture, and the like, and as a result the life of the gauge is materially increased.

A protective covering for gauges of my improved construction is comparatively simple, is inexpensive of manufacture, and is very effective in performing the functions for which it is intended.

I claim as my invention:

1. The combination with a pressure gauge, of a protective covering therefor, which protective covering is formed in a single piece from flexible elastic material, said covering comprising a circular wall, a disk-shaped bottom wall, a flange projecting inwardly and upwardly from the upper edge of said wall there being an opening in the protective covering for the accommodation of the shank of said pressure gauge, the walls of said protective covering being uniform in thickness and provided with smooth unbroken inner faces so as to fit snugly against the body of the gauge to which said protective covering is applied.

2. As a new article of manufacture, a protective covering for pressure gauges comprising a hollow cup-shaped member formed in a single piece from elastic moisture-proof material and having a relatively short circular side wall, the diameter of which is uniform throughout its length, a flat disk-shaped bottom wall, a flange projecting inwardly and upwardly from the upper edge of the side wall, said side wall, bottom well and flange being formed integral with each other, said walls and flange being substantially uniform in thickness, there being an opening formed in the cup shaped member for the accommodation of the shank of a pressure gauge to which the protective covering is applied, and the entire inner surfaces of the wells of said cup-shaped member being smooth and unbroken so as to fit snugly against the body of the gauge to which said covering is applied.

In testimony whereof I affix my signature.

GEORGE E. FARLEY.